(12) United States Patent
Takabu

(10) Patent No.: US 10,085,583 B2
(45) Date of Patent: Oct. 2, 2018

(54) COOKING DEVICE WITH CORRUGATED BLADE, COOKING METHOD, AND FOOD

(71) Applicant: KABUSHIKI KAISYA LEBEN HANBAI, Kanagawa (JP)

(72) Inventor: Atsushi Takabu, Kanagawa (JP)

(73) Assignee: KABUSHIKI KAISYA LEBEN HANBAI, Kanagawa (JP)

( * ) Notice: Subject to any disclaimer, the term of this patent is extended or adjusted under 35 U.S.C. 154(b) by 0 days.

(21) Appl. No.: 15/527,966

(22) PCT Filed: Nov. 13, 2015

(86) PCT No.: PCT/JP2015/081954
§ 371 (c)(1),
(2) Date: May 18, 2017

(87) PCT Pub. No.: WO2016/080302
PCT Pub. Date: May 26, 2016

(65) Prior Publication Data
US 2017/0311745 A1    Nov. 2, 2017

(30) Foreign Application Priority Data

Nov. 19, 2014 (JP) .................................. 2014-234686
Apr. 3, 2015 (JP) ............................. 2015-001628 U

(51) Int. Cl.
*A01F 11/06* (2006.01)
*A47J 17/02* (2006.01)
(Continued)

(52) U.S. Cl.
CPC ................. *A47J 17/02* (2013.01); *B26B 3/00* (2013.01); *B26D 1/0006* (2013.01); *B26D 3/28* (2013.01); *B26D 2001/006* (2013.01)

(58) Field of Classification Search
CPC ... A47J 17/00–17/08; B26B 3/00; B26B 9/02; B26D 3/28
(Continued)

(56) References Cited

U.S. PATENT DOCUMENTS 5,865,110 A * 2/1999 Yonezawa ............... A47J 17/02
30/123.5
2005/0262703 A1* 12/2005 Best ......................... A47J 17/02
30/279.6
(Continued)

FOREIGN PATENT DOCUMENTS

| JP | H07-246154 A | 9/1995 |
|---|---|---|
| JP | 2001-314316 A | 11/2001 |
| WO | 2013/046203 | 4/2013 |

OTHER PUBLICATIONS

International Search Report and Written Opinion, International Patent Application No. PCT/JP2015/081954, dated Feb. 2016, with English translation of Search Report (12 pages).

*Primary Examiner* — Dana Ross
*Assistant Examiner* — Joseph Iskra
(74) *Attorney, Agent, or Firm* — Hamre, Schumann, Mueller & Larson, P.C.

(57) ABSTRACT

A cooking device for cutting a foodstuff into a prescribed shape. The cooking device includes a cutting portion and a handle attached to the cutting portion. The cutting portion includes a cutting blade and a guide; the cutting blade includes a wave-shaped portion in which trough portions, which recede downward in a direction approaching a foodstuff to be cut, and crest portions, which project upward in the opposite direction to the downward direction, appear alternatively; in the cutting blade, crests, which are the tops of the cutting blade crest portions, and troughs, which are the bottoms of the cutting blade trough portions, appear alternatively; and in the guide, at least a portion of a guide (Continued)

surface, which follows the surface of the foodstuff to be cut, is located between the cutting blade crests and cutting blade troughs in the vertical direction.

3 Claims, 15 Drawing Sheets

(51) Int. Cl.
  *B26B 3/00* (2006.01)
  *B26D 3/28* (2006.01)
  *B26D 1/00* (2006.01)
(58) Field of Classification Search
  USPC .............. 99/567, 584, 509, 546, 553, 642; 30/123.5, 279.2–279.6, 346.55, 346.56, 30/355; D7/693–696
  See application file for complete search history.

(56) References Cited

U.S. PATENT DOCUMENTS

| | | | |
|---|---|---|---|
| 2012/0085249 A1* | 4/2012 | Kuan | A47J 17/02 99/584 |
| 2014/0230253 A1* | 8/2014 | Ancsel | A47J 17/02 30/123.5 |

* cited by examiner

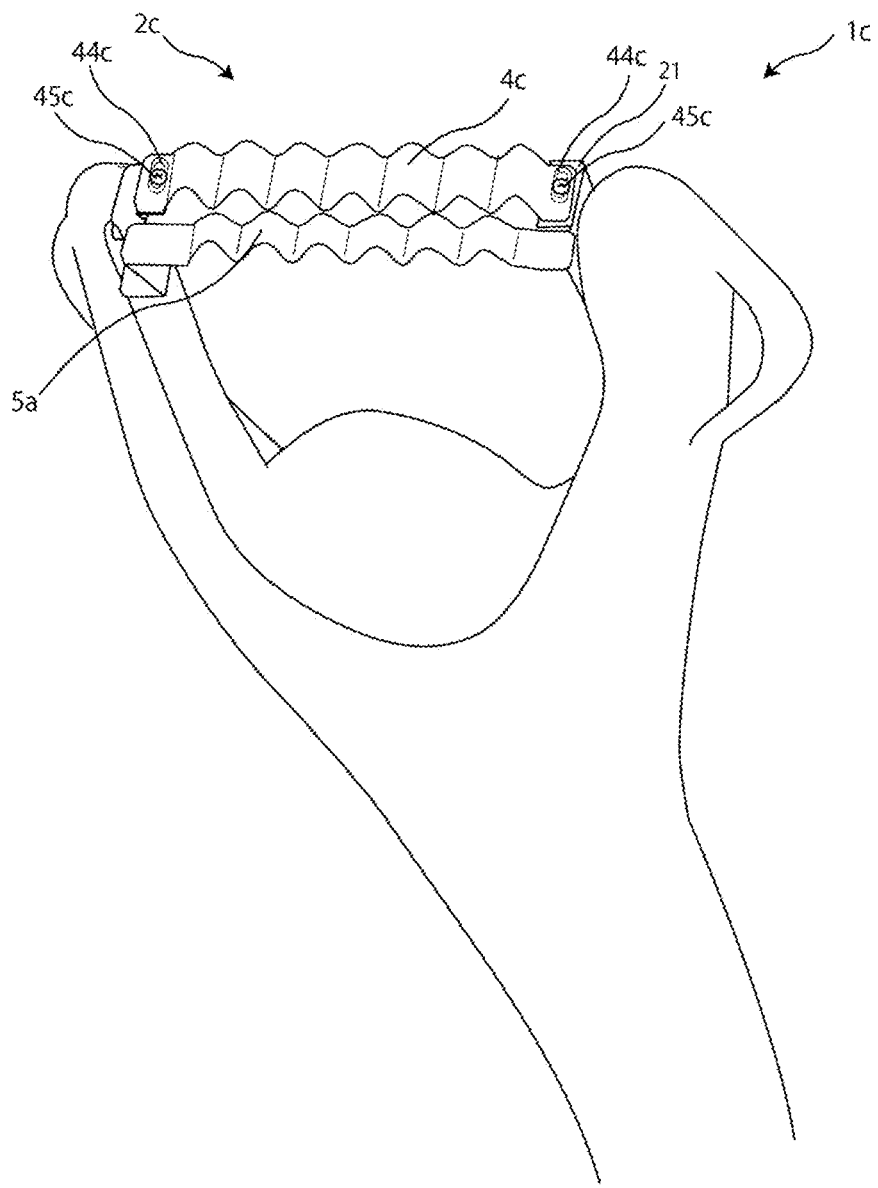

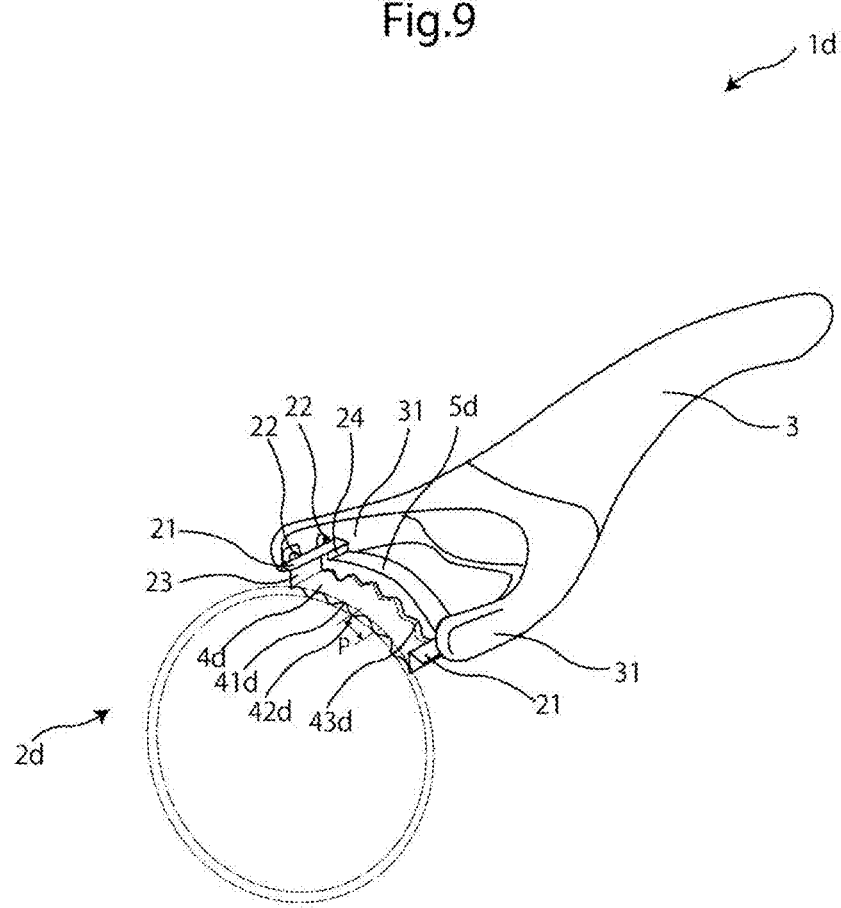

COOKING DEVICE WITH CORRUGATED BLADE, COOKING METHOD, AND FOOD

TECHNICAL FIELD

The present invention relates to a cooking device, a cooking method, and food. The present invention claims priority to Japanese Patent Application No. 2014-234686 filed Nov. 19, 2014 and Japanese Utility Model Registration Application No. 2015-1628 filed Apr. 3, 2015, the contents of which are incorporated herein by reference for the designated countries where the incorporation by reference of the documents is approved.

BACKGROUND ART

Conventionally, kitchen knives are commonly used to cut foods, such as root vegetables, cucumbers, pumpkins, in particular.

Peelers have also been used for cutting foods in recent years. A peeler is disclosed, for example, in Patent Literature 1, which has a blade member with a straight cutting edge on one side of an elongated hole and with a straight guide on the other side. A peeler is disclosed, for example, in Patent Literature 2, which has a blade member with an arcuate cutting edge on one side of an elongated hole and with an arcuate guide on the other side.

CITATION LIST

Patent Literature

Patent Literature 1: JP H07-246154 A
Patent Literature 2: JP 2001-314316 A

SUMMARY OF INVENTION

Technical Problem

However, while a kitchen knife is suitable for dice cutting and rough cutting, it is difficult for a common user to cut food into a shape having a predetermined length and thickness. Since both of the above-described peelers are structured focusing on the function of peeling, it is difficult to cut food into a shape having a predetermined length and thickness using the peeler, as with using the kitchen knife.

Meanwhile, it has been recommended in recent years that we consume more vegetables for our health, and the capability of easily cutting foods, such as root vegetables, into a shape that cause changes in appearance, texture and the like leads to the creation of new dish menu and contributes to health promotion, so that there is a need for a cooking device suitable for cutting in such a way.

The present invention is intended to solve the above problems, and it is an object of the present invention to provide a cooking device for cutting food into a predetermined shape, a cooking method using the cooking device, and food.

Solution to Problem

To solve the problem, a cooking device according to an aspect of the present invention includes: a cutter; and a grip to which the cutter is attached, wherein the cutter includes a blade and a guide, the cutting blade includes a corrugated portion with alternating valleys each having a downwardly concave shape in a direction approaching food to be cut and ridges each having an upwardly convex shape, opposite to downward, the cutting blade has alternating ridge peaks being peaks of the ridges of the cutting blade and valley bottoms being bottoms of the valleys of the cutting blade, and the guide has a guide surface for following food to be cut, at least part of the guide surface being located between extension lines of the ridge peaks of the cutting blade and extension lines of the valley bottoms of the cutting blade in a vertical direction.

In addition, the cutting blade may have a cutting edge formed on an edge located forward in a cutting direction, and the cutting edge may be shaped such that it projects forward from the ridge peaks of the cutting blade to the valley bottoms of the cutting blade.

In addition, the cutting blade may have different adjacent pitches, where each of the different adjacent pitches is a distance between adjacent ridge peaks of the cutting blade or between adjacent valley bottoms of the cutting blade.

In addition, a line connecting the ridge peaks of the cutting blade and a line connecting the valley bottoms of the cutting blade are arcuate, and the guide may have an arcuate shape.

In addition, at least part of the cutting edge may be provided with a jagged edge.

In addition, to solve the problem, a cooking device according to an aspect of the present invention includes: a cutter; and a grip to which the cutter is attached, wherein the cutter includes a blade and at a guide, the cutting blade includes a corrugated portion with alternating valleys each having a downwardly concave shape in a direction approaching food to be cut and ridges each having an upwardly convex shape, opposite to downward, the cutting blade has alternating ridge peaks being peaks of the ridges of the cutting blade and valley bottoms being bottoms of the valleys of the cutting blade, the guide includes a corrugated portion with alternating valleys each having a downwardly concave shape in a direction approaching food to be cut and ridges each having an upwardly convex shape, opposite to downward, and the guide has alternating ridge peaks being peaks of the ridges of the guide and valley bottoms being bottoms of the valleys of the guide.

In addition, the cutting blade may have pitches that are the same between any adjacent ridges or between any adjacent valleys, where each of the pitches is a distance between adjacent ridge peaks of the cutting blade or between adjacent valley bottoms of the cutting blade, the guide may have pitches that are the same between any adjacent ridges or between any adjacent valleys and are the same as those of the cutting blade, where each of the pitches is a distance between adjacent ridge peaks of the guide or between adjacent valley bottoms of the guide, the cutting blade and the guide may be arranged such that the ridges of each other or the valleys of each other are offset, and the guide may have a guide surface for following food to be cut, a portion, which corresponds to the valley bottoms of the guide, of the guide surface being located between extension lines of the ridge peaks of the cutting blade and extension lines of the valley bottoms of the cutting blade in a vertical direction.

In addition, the guide may include a plurality of bead-shaped elements.

In addition, the guide may include a position changing mechanism for adjusting a position of the guide surface in a direction orthogonal to a cutting direction.

In addition, the cutting blade may include a position changing mechanism for adjusting a position of the cutting blade in a cutting direction.

In addition, a line connecting the ridge peaks of the cutting blade and a line connecting the valley bottoms of the cutting blade are arcuate.

In addition, a line connecting the ridge peaks of the guide and a line connecting the valley bottoms of the guide, are arcs, and the cutting blade and the guide may have the same radius of curvature of the arc.

In addition, the cutter may include two of the cutting blade and two of the guide, the two cutting blades may be arranged in a direction orthogonal to the cutting direction with an end of one cutting blade coupled to an end of another cutting blade, and the two guides may be arranged in a direction orthogonal to the cutting direction with an end of one guide coupled to an end of another guide.

In addition, the cooking device may further include two cutters including the at least one cutter.

In addition, to solve the problem, an aspect of the present invention may be a cooking method for cutting food to be cut using the cooking device.

In addition, to solve the problem, an aspect of the present invention may be food cut by the cooking method.

Advantageous Effects of Invention

The present invention provides a cooking device for cutting food into a predetermined shape, a cooking method using the cooking device, and food.

BRIEF DESCRIPTION OF DRAWINGS

FIG. 1A is a perspective view of the cooking device and FIG. 1B is a view illustrating an example of a cutter of the cooking device.

FIG. 2A is a view seen from the side and FIG. 2B is an anterior-posterior view.

FIG. 3A shows another example and FIG. 3B shows still another example.

FIG. 4A is a view seen from the front, FIG. 4B shows a state in which the cooking device is used, and FIG. 4C shows cut pieces.

FIG. 7 is a view illustrating a cooking device according to a second modification of the second embodiment.

FIG. 8A shows one example and FIG. 8B shows another example.

FIG. 9 is a view illustrating a cooking device according to a third embodiment.

FIG. 10A shows a state in which the cooking device is used and FIG. 10B shows food to be cut that has been cut.

FIG. 12A shows the cooking device and FIG. 12B shows cut pieces.

DESCRIPTION OF EMBODIMENTS

Exemplary embodiments of a cooking device according to the present application will now be described with reference to the drawings. In the cooking device according to the present application, a cutting direction is referred to as "forward" and the opposite direction is referred to as "rearward". The direction approaching food to be cut in cutting work is referred to as "downward" and the opposite direction is referred to as "upward".

[First Embodiment]

Figure 1A:
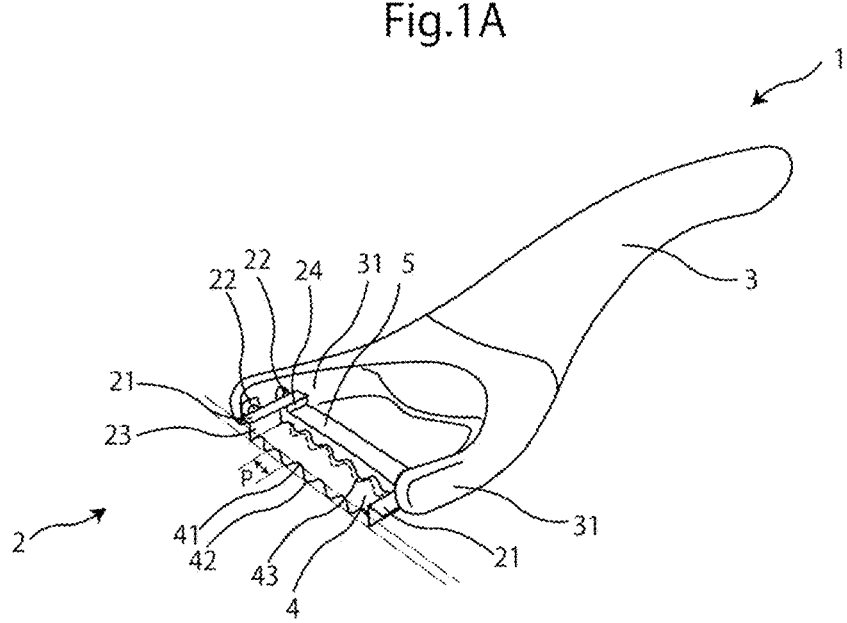
FIGS. 1A and 1B are views illustrating a cooking device according to a first embodiment, where
Figure 1B:
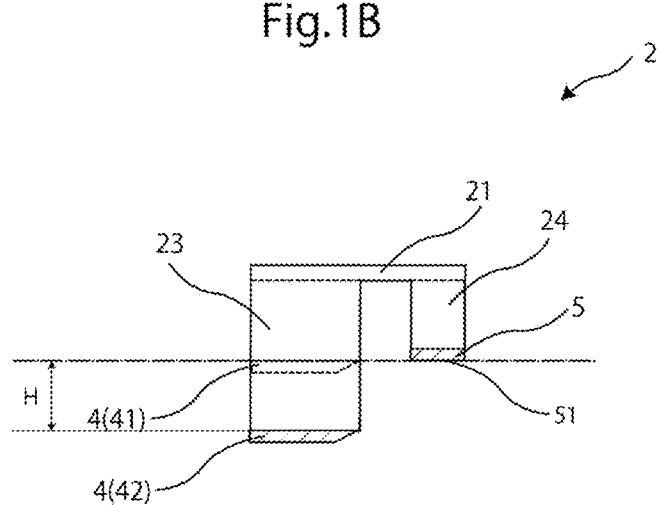
Figure 2A:
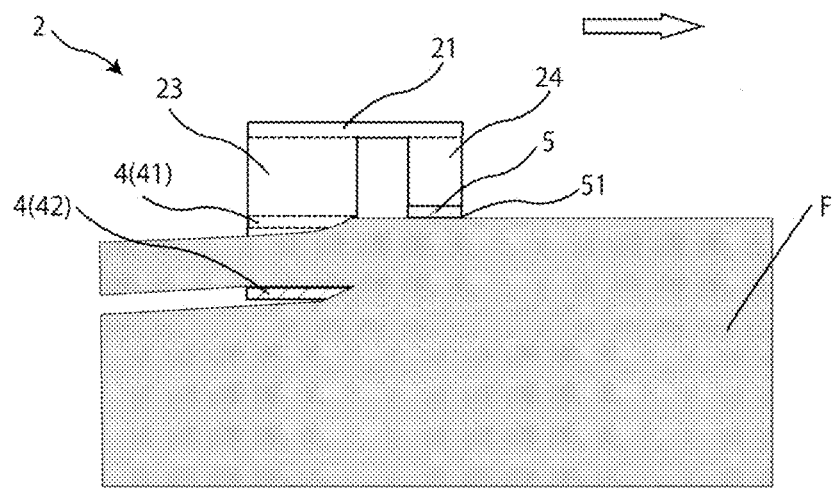
FIGS. 2A and 2B are views showing the cooking device in use according to the first embodiment, where
Figure 2B:
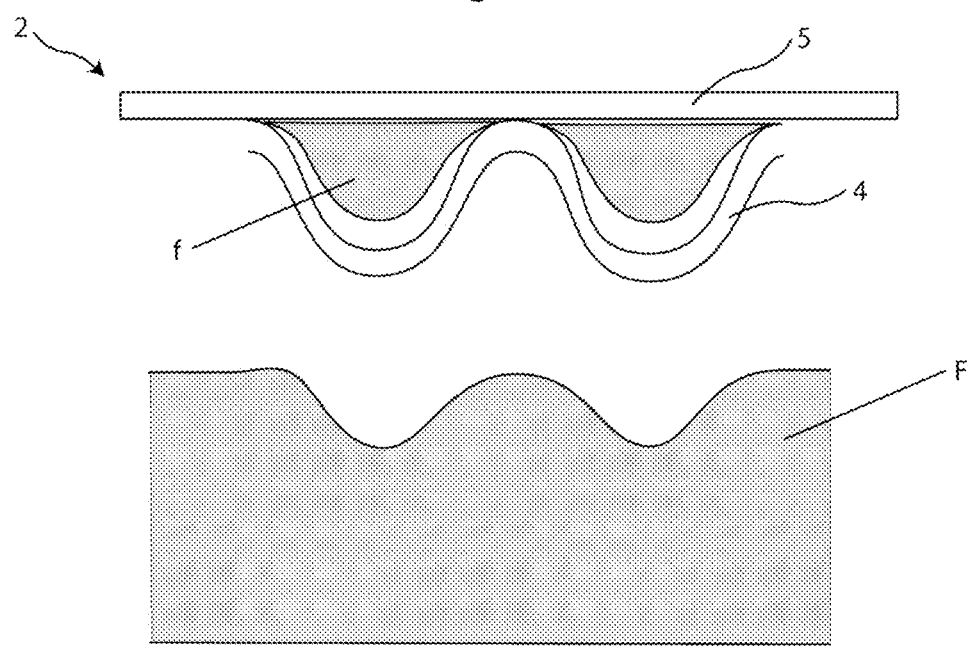

FIGS. 1A and 1B are views illustrating a cooking device 1 according to a first embodiment, where FIG. 1A is a perspective view of the cooking device 1 and FIG. 1B is a view illustrating an example of a cutter 2 of the cooking device 1. FIGS. 2A and 2B are views showing an example of the cutter 2 of the cooking device 1 in use, where FIG. 2A is a view seen from the side and FIG. 2B is an anterior-posterior view. As illustrated, the cooking device 1 includes a cutter 2 for cutting food to be cut F and a grip 3 to which the cutter 2 is attached.

The cutter 2 includes a cutting blade 4 for cutting food in cutting work and a guide 5 functioning as a guide in the cutting work. The cutter 2 may be integrally formed with the cutting blade 4, the guide 5, etc. or may be formed of separate components such as cutting blade 4, guide 5, etc. In the present embodiment, an integrally formed cutter 2 is described as an example.

The cutter 2 includes two connecting portions 21 for connecting the cutting blade 4 and the guide 5 at each of the left and right ends. The two connecting portions 21 are each provided with two attachments 22, and the cutter 2 is attached to the grip 3 through the attachments 22. The connecting portion 21 includes a cutting blade connecting portion 23 connected to the cutting blade 4 and a guide connecting portion 24 connected to the guide 5. In other words, the cutting blade 4 and the guide 5 are attached to the grip 3 through two connecting portions 21.

The grip 3 is a portion to be gripped when cutting work is performed on food. While an example of Y-shaped grip 3 is described herein as an example, the grip 3 may be any shape such as T-shaped, I-shaped, U-shaped. The grip 3 can be formed of a material such as, for example, plastic resin or metal.

The grip 3 includes holders 31 to which the cutter 2 is attached. In the present embodiment, the holders 31 are formed with two separate parts in a Y-shape, and the cutter 2 is attached to the two holders 31.

The cutting blade 4 is horizontally elongated. The cutting blade 4 includes a corrugated portion with alternating valleys each having a downwardly concave shape and ridges each having an upwardly convex shape. That is, the cutting blade 4 has a plate shape including the corrugated portion with alternating ridge peaks being peaks of the ridges and valley bottoms being bottoms of the valleys. In the present embodiment, a line connecting ridge peaks 41 is substantially straight and a line connecting valley bottoms 42 is also substantially straight, as illustrated.

A height difference H between the ridge peak 41 and the valley bottom 42 is 2 mm or more. A pitch P, which is the distance between adjacent ridge peaks 41 (or between adjacent valley bottoms 42), is 4 mm or more. Preferably, the height difference H of the cutting blade 4 is in the range from 2 mm to 10 mm. The pitch P of the cutting blade 4 is in the range from 5 mm to 20 mm.

The cutting blade 4 is provided with a cutting edge 43 at the front. As an example, as shown in the figure, the cutting edge 43 is formed on the front edge of the cutting blade 4. The cutting edge 43 is formed, for example, as a band having a uniform width.

The guide 5 is a horizontally elongated plate. In the present embodiment, the guide 5 has a flat plate shape. The guide 5 has a guide surface 51 (herein the bottom surface) for following the surface of food to be cut, and the guide surface 51 comes into contact with food to be cut in cutting work and guide the cutting work.

The guide 5 is located forward of the cutting blade 4. At least part of the guide surface of the guide 5 is located between extension lines of the ridge peaks 41 of the cutting blade and extension lines of the valley bottoms 42 of the cutting blade in a vertical direction. In the present embodiment, the ridge peak 41 of the cutting blade 4 is located at the same height as the guide surface 51 of the guide 5 as an example, as illustrated in FIG. 1B. Alternatively, as an example, the guide surface may also be positioned below the ridge peak 41 of the cutting blade 4 between the ridge peak 41 of the cutting blade and the valley bottom 42 of the cutting blade while taking into account the softness and resilience of the food.

When the guide surface 51 of the guide 5 is as high as the ridge peak 41 of the cutting blade 4, the surface of the food to be cut F is cut into a corrugated shape by the cutter 2 as shown in FIGS. 2A and 2B. Along with this, a plurality of rod-shaped cut pieces f are obtained. Herein, the rod-shaped cut piece f is shaped such that its cross-sectional shape gradually decreases in thickness from the center to both ends.

Thus, the cooking device 1 can easily cut the surface of the food to be cut into a corrugated shape. The plurality of cut pieces, each having a cross-sectional shape which gradually decreases in thickness from the center to both ends, can be easily obtained.

Figure 3A:
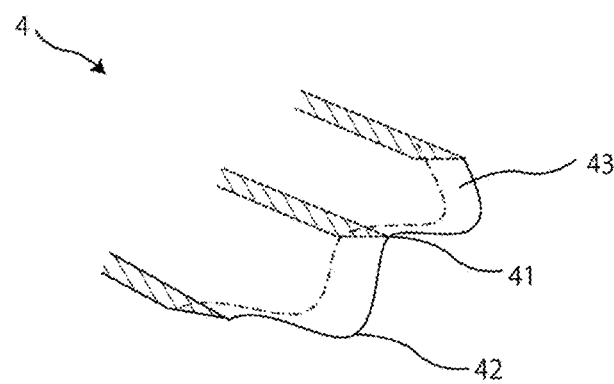
FIGS. 3A and 3B are views showing other examples of the cooking device according to the first embodiment, where

Here, the cutting blade 4 may have a sharpened cutting edge 43 as shown in FIG. 3A. For example, the cutting edge 43 is formed to gradually project forward from the ridge peak 41 to the valley bottom 42. In other words, the cutting edge 43 of the cutting blade 4 is formed to project in a cutting direction so that a valley bottom 42 portion is located most forward and a ridge peak 41 portion is located most rearward. Forming the cutting blade 4 in this manner further improves the cutting performance of the cooking device 1.

Figure 3B:
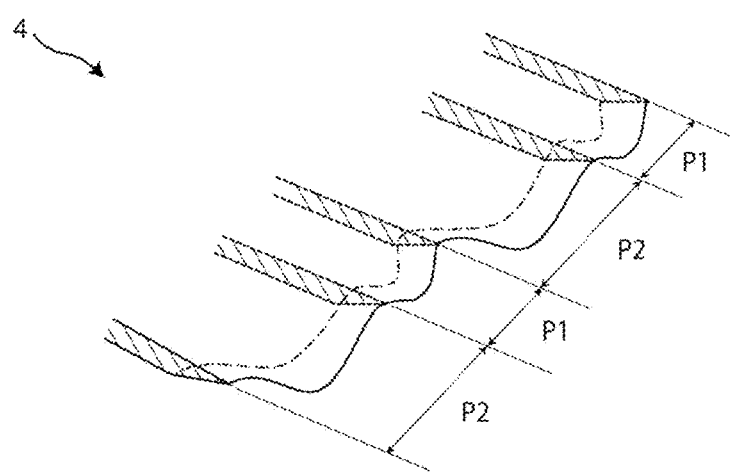

As shown in FIG. 3B, the cutting blade 4 may have different adjacent pitches P (for example, P1 and P2 in the drawing). Although not illustrated, the pitches P may be determined to be randomly different. Forming the cutting blade 4 in this manner can easily provide cut pieces having different widths in a single cutting.

[Second Embodiment]

Figure 4A:
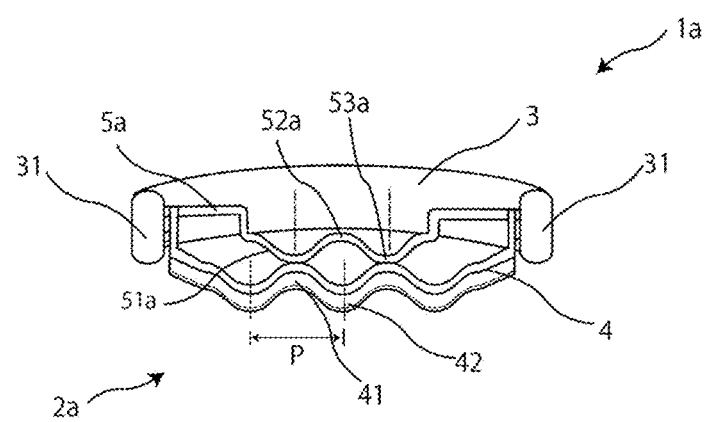
FIGS. 4A to 4C are views illustrating a cooking device according to a second embodiment, where
Figure 4B:
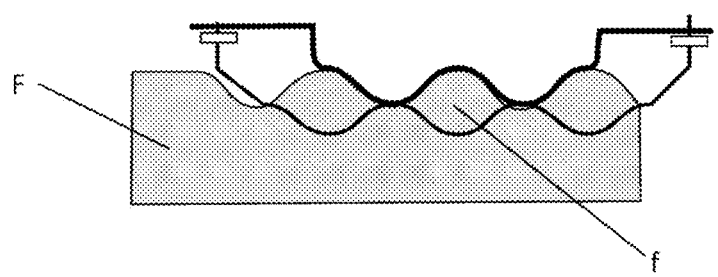
Figure 4C:

FIGS. 4A, 4B, and 4C are views illustrating a cooking device 1a according to a second embodiment, where FIG. 4A is a view seen from the front, FIG. 4B shows the cooking device 1a in use, and FIG. 4C shows cut pieces. The cooking device 1a is similar to the cooking device 1 according to the first embodiment except for a cutter 2a, wherein like reference numerals denote like elements and points different from the cooking device 1 are described.

A cutter 2a includes the cutting blade 4 for cutting food in cutting work and a guide 5a functioning as a guide in the cutting work.

The guide 5a is plate-shaped and includes a corrugated portion with alternating valleys each having a downwardly concave shape and ridges each having an upwardly convex shape. That is, the guide 5a has a plate shape including the corrugated portion with alternating ridge peaks being peaks of the ridges and valley bottoms being bottoms of the valleys. Thus, a guide surface 51a of the guide 5a includes the corrugated portion. In the present embodiment, a line connecting ridge peaks 52a is substantially straight and a line connecting valley bottoms 53a is also substantially straight.

A pitch P, which is the distance between adjacent ridge peaks 52a (or between adjacent valley bottoms 53a), is 4 mm or more. Preferably, the pitch P of the guide 5a is in the range from 5 mm to 20 mm. Preferably, the pitch of the guide 5a is the same as that of the cutting blade 4.

The guide 5a is located forward of the cutting blade 4 and is arranged such that the ridges and valleys of the guide 5a face the valleys and ridges of the cutting blade 4, respectively (i.e., the ridges or the valleys of each other are offset by 1/2 pitch). At least part of the guide surface 51a of the guide 5a is located between extension lines of the ridge peaks of the cutting blade 4 and extension lines of the valley bottoms of the cutting blade 4 in a vertical direction. In the present embodiment, the guide surface 51a corresponding to the valley bottoms 53a of the guide surface 51a is located between extension lines of the ridge peaks of the cutting blade 4 and extension lines of the valley bottoms of the cutting blade 4 in a vertical direction.

As an example, as shown in FIG. 4A, the guide surface 51a corresponding to the valley bottoms 53a of the guide 5a and the ridge peaks 41 of the cutting blade 4 are formed at the same height. In this case, the corrugated guide surface 51a of the guide 5a guides cutting work along grooves and ridges remaining on the surface of the food to be cut F after a first cutting. When the cutting blade 4 cuts the food to be cut F, a plurality of rod-shaped cut pieces f are obtained as shown in FIGS. 4B and 4C. The rod-shaped cut piece f has a cross-sectional shape whose center expands upward and downward and is vertically symmetrical.

Thus, by using the cooking device 1a according to the second embodiment, cut pieces each having a shape whose center expands upward and downward can be easily obtained.

Figure 5:
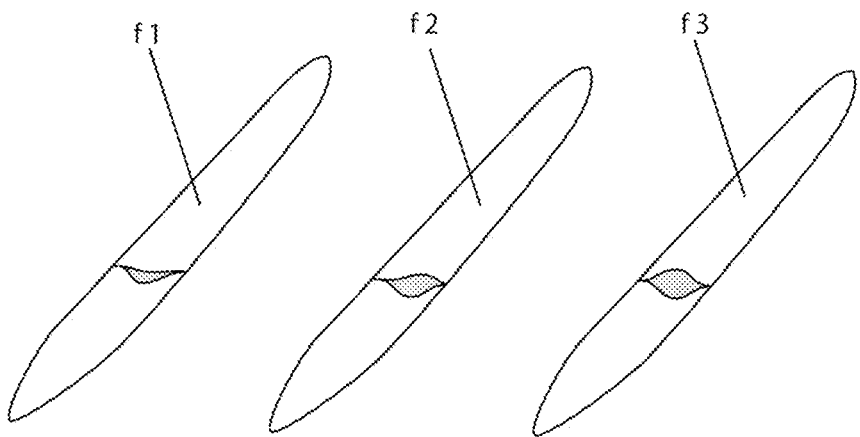
FIG. 5 is a view illustrating other examples of pieces cut by the cooking device according to the second embodiment.

The guide 5a maybe arranged to be offset from the cutting blade 4 by a distance different from the above, for example, by 1/4 or 1/8 pitch. This provides cut pieces f, such as f1, f2, and f3 illustrated in FIG. 5, having more variety of shapes.

[First Modification of Second Embodiment]

Figure 6:
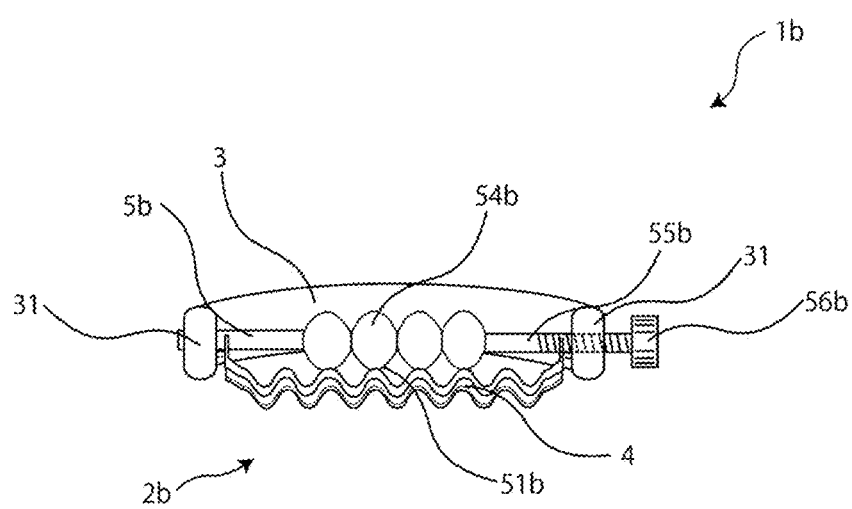
FIG. 6 is a view illustrating a cooking device according to a first modification of the second embodiment.

FIG. 6 is a view illustrating a cooking device 1b according to a first modification of the second embodiment. The cooking device 1b is similar to the cooking device 1a according to the second embodiment except for a guide 5b of a cutter 2b, wherein like reference numerals denote like elements and points different from the cooking device 1a are described.

In a cutter 2b, the cutting blade 4 and a guide 5b are formed separately and attached to the holders 31. The guide 5b includes a position changing mechanism for adjusting a position of the guide surface in a direction orthogonal to the cutting direction. As an example, the guide 5b includes a rotational guide 54b and a guide position changer 55b.

The rotational guide 54b, which includes a plurality of bead-shaped elements, is inserted through the guide position changer 55b and attached to the grip 3 through the guide position changer 55b. The guide surface 51b that guides cutting work while comes in contact with the surface of food is formed of the surface, which comes in contact with the food, of the rotational guide 54b.

The guide position changer 55b has a male thread and a knob 56b at least at one end thereof. At least one of the holders 31 has a female thread corresponding to the guide position changer 55b. By rotating the knob 56b, the rotational guide 54b inserted into the guide position changer 55b rotates and slides in the direction orthogonal to the cutting direction.

By using the cooking device 1b, the position of the guide 5b in the direction orthogonal to the cutting direction and, more specifically, the position of the guide surface 51b can be adjusted, and cut pieces having more various cross-sectional shapes can be obtained.

The arrangement for adjusting the position of the guide 5b in the direction orthogonal to the cutting direction is not limited to the above, and any of the conventional techniques having similar effects can be used.

[Second Modification of Second Embodiment]

FIG. 7 is a view illustrating a cooking device 1c according to a second modification of the second embodiment. The cooking device 1c is similar to the cooking device 1a according to the second embodiment except for a cutting blade 4c of a cutter 2c, wherein like reference numerals denote like elements and points different from the cooking device 1a are described.

A cutter 2c includes a cutting blade 4c for cutting food in cutting work and the guide 5a functioning as a guide in the cutting work. The cutting blade 4c includes a position changing mechanism for adjusting a position in the cutting direction. As an example, the cutting blade 4c includes cutting blade position changers 44c and bolts 45c. Otherwise the cutting blade 4c is similar to the cutting blade 4, and thus description is omitted.

A cutting blade position changer 44c is provided at each end of the cutting blade 4c. As an example, as shown in FIG. 7, the cutting blade position changer 44c is a substantially elliptical through-hole extending in the cutting direction and is attached to the connecting portion 21 by the bolt 45c. The position of the cutting blade 4c in the cutting direction can be adjusted by the cutting blade position changers 44c and the bolts 45c.

Figure 8A:
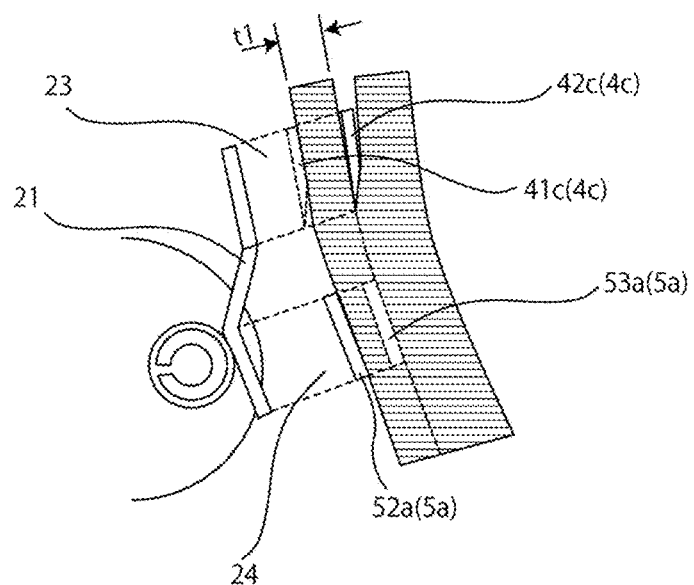
FIGS. 8A and 8B are views showing the cooking device in use according to the second modification of the second embodiment, where
Figure 8B:
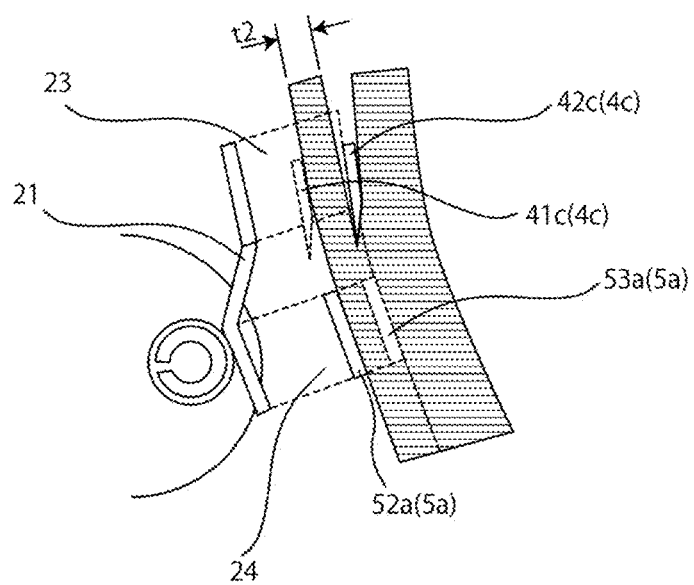

When the cutting blade 4c is attached at a first position located forwardly in the cutting direction, the central thickness of the cut piece f is t1 as shown in FIG. 8A. On the other hand, when the cutting blade 4c is attached at a second position located rearwardly of the first position in the cutting direction, the distance between the cutting blade 4c and the guide 5a decreases and the cutting blade 4c penetrates less into the food to be cut F, as shown in FIG. 8B, so that the thickness of the cut piece f is t2 thinner than t1.

Thus, the cooking device 1c allows the thickness of the cut piece f to be easily adjusted by changing the position at which the cutting blade 4c is attached.

[Third Embodiment]

Figure 10A:
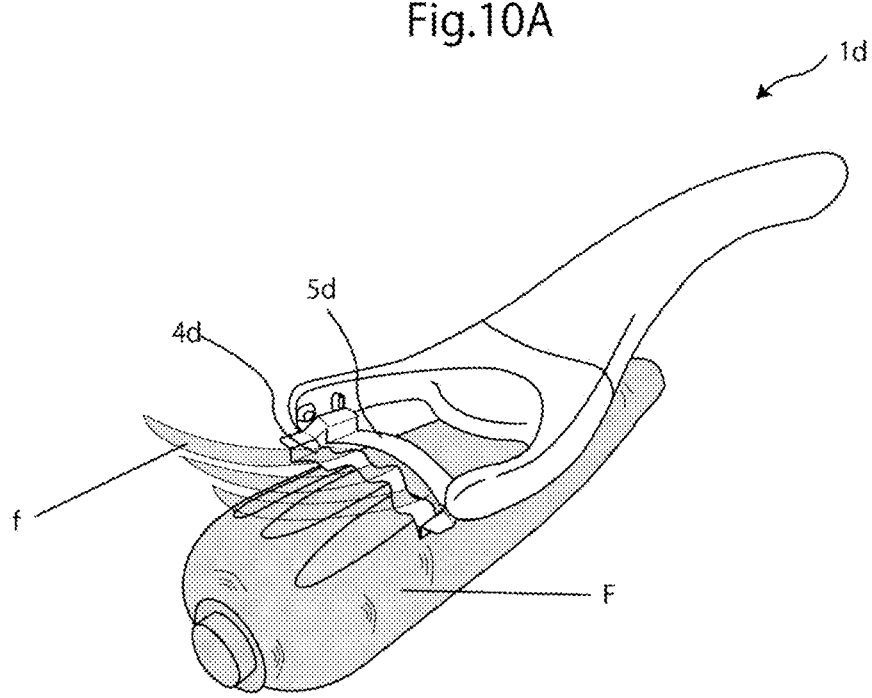
FIGS. 10A and 10B are views showing the cooking device in use according to the third embodiment, where
Figure 10B:
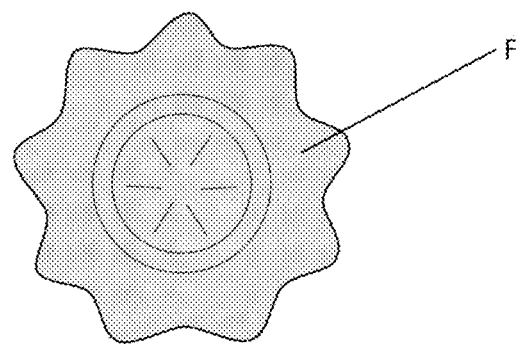

FIG. 9 is a view illustrating a cooking device 1d according to a third embodiment. FIGS. 10A and 10B are views showing the cooking device 1d in use, where FIG. 10A shows a state in which the cooking device 1d is used and FIG. 10B shows food to be cut F that has been cut. The cooking device 1d is similar to the cooking device 1 according to the first embodiment except for a cutter 2d, wherein like reference numerals denote like elements and points different from the cooking device 1 are described.

A cutter 2d includes a cutting blade 4d for cutting food in cutting work and a guide 5d functioning as a guide in the cutting work.

The cutting blade 4d includes a corrugated portion with alternating valleys each having a downwardly concave shape and ridges each having an upwardly convex shape. That is, the cutting blade 4d has a plate shape with alternating ridge peaks 41d being peaks of the ridges and valley bottoms 42d being bottoms of the valleys. A pitch P, which is the distance between adjacent ridge peaks 41d (or between adjacent valley bottoms 42d), is 4 mm or more. Preferably, the pitch P of the cutting blade 4d is in the range from 5 mm to 20 mm.

In the present embodiment, a line connecting the ridge peaks 41d is arcuate and a line connecting the valley bottoms 42d is also arcuate. The radius of curvature of an arc can be determined based on the shape of the food to be cut. As an example, an upward arc is employed herein.

The cutting blade 4d can be formed, for example, by corrugating an arcuate plate member in such a manner that ridges and valleys are alternately arranged along the arc.

The guide 5d is an arcuate plate. Preferably, the radius of curvature of the guide 5d is similar to that of the cutting blade 4d.

The guide 5d is located forward of the cutting blade 4d. Preferably, at least part of a guide surface 51d of the guide 5d is located between extension lines of the ridge peaks 41d of the cutting blade 4d and extension lines of the valley bottoms 42d of the cutting blade 4d in a vertical direction.

As an example, when the guide surface 51d of the guide 5d is as high as the ridge peak 41d of the cutting blade 4d, the cooking device 1d is moved in the cutting direction (i.e., forward), the guide 5d guides cutting work along the surface of the food to be cut F, and the cutting blade 4d penetrates the food, as shown in FIG. 10A, whereby the food to be cut F is cut to form a cross-sectional shape like a flower as shown in FIG. 10B. Along with this, a plurality of rod-shaped cut pieces f are obtained. The rod-shaped cut piece f is shaped such that its cross-sectional shape gradually decreases in thickness from the center to both ends.

Thus, in addition to the above effects, the cooking device 1d can cut a rod-shaped food F to form a beautiful cross-sectional shape such as a flower, and cut pieces having beautiful shapes can be easily obtained by further cutting the food to be cut F into round slices.

[First Modification of Third Embodiment]

Figure 11:
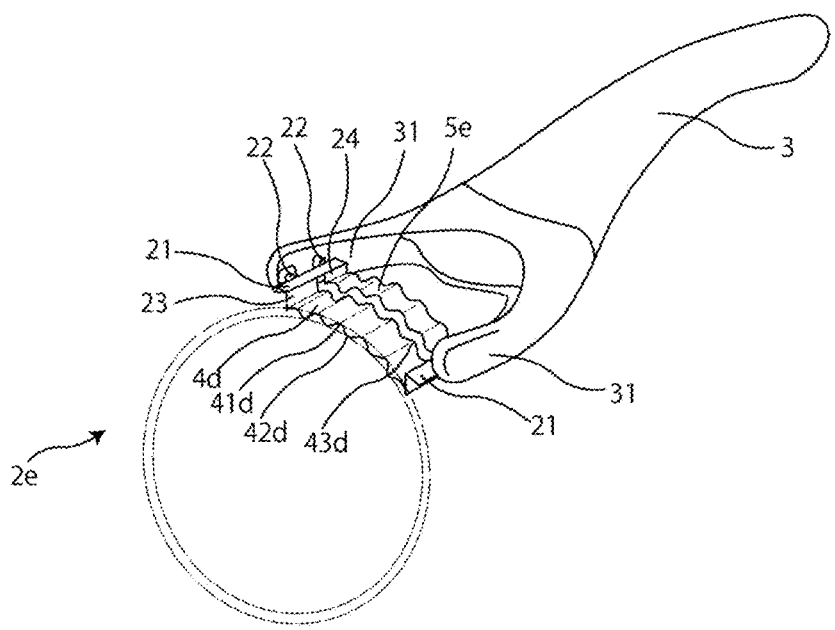
FIG. 11 is a view illustrating a cooking device according to a first modification of the third embodiment.

FIG. 11 is a view illustrating a cooking device 1e according to a first modification of the third embodiment. The cooking device 1e is similar to the cooking device 1d according to the third embodiment except for a cutter 2e, wherein like reference numerals denote like elements and points different from the cooking device 1d are described.

A cutter 2e includes the cutting blade 4d for cutting food in cutting work and a guide 5e functioning as a guide in the cutting work. The cutting blade 4d is as described above, and description thereof is omitted herein.

The guide 5e includes a corrugated portion with alternating valleys each having a downwardly concave shape and ridges each having an upwardly convex shape. That is, the guide 5e has a plate shape with alternating ridge peaks 52e being peaks of the ridges and valley bottoms 53e being bottoms of the valleys. A pitch, which is the distance between adjacent ridge peaks 52e (or between adjacent valley bottoms 53e), is 4 mm or more. Preferably, the pitch of the guide 5e is in the range from 5 mm to 20 mm.

In the present embodiment, a line connecting the ridge peaks 52e is arcuate and a line connecting the valley bottoms 53e is also arcuate. The radius of curvature of an arc can be determined based on the shape of the food to be cut. As an example, an upward arc is employed herein. The radius of curvature of the guide 5e, which can be determined based on the shape of the food to be cut, is preferably the same as that of the cutting blade 4d.

The guide 5e can be formed, for example, by corrugating an arcuate plate member in such a manner that ridges and valleys are alternately arranged along the arc.

The guide 5e is located forward of the cutting blade 4d and is arranged in aligned relationship with the cutting blade 4d. That is, the ridge peak 52e of the guide 5e and the ridge peak 41d of the cutting blade 4d are at the same position in the direction orthogonal to the cutting direction, and the valley bottom 53e of the guide 5e and the valley bottom 42d of the cutting blade 4d are at the same position in the direction orthogonal to the cutting direction.

A guide surface 51e of the guide 5e is located above the cutting blade 4d. When the cooking device 1e is moved in the cutting direction (i.e., forward), the guide 5e guides cutting work along the surface of food to be cut, the cutting blade 4d penetrates and cuts the food, and thus a corrugated plate-shaped cut piece can be obtained.

Thus, by using the cooking device 1e, corrugated plate-shaped cut pieces can be easily obtained.

[Second Modification of Third Embodiment]

Figure 12A:
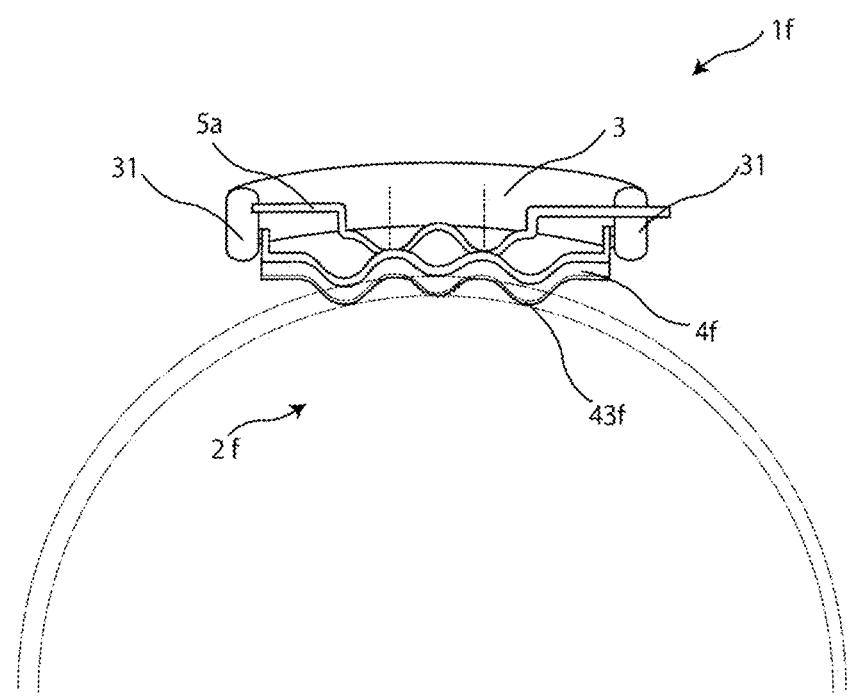
FIGS. 12A and 12B are views illustrating a cooking device according to a second modification of the third embodiment.
Figure 12B:
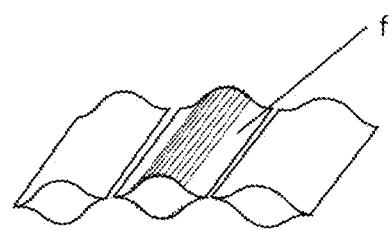

FIGS. 12A and 12B are views illustrating a cooking device if according to a second modification of the third embodiment. The cooking device if is similar to the cooking device 1d according to the third embodiment except for a cutting blade 4f of a cutter 2f, wherein like reference numerals denote like elements and points different from the cooking device 1d are described.

A cutter 2f includes a cutting blade 4f for cutting food in cutting work and the guide 5a functioning as a guide in the cutting work. The guide 5a is as described above, and description thereof is omitted herein.

Since the cutting blade 4f is similar to the cutting blade 4d according to the third embodiment except for a cutting edge 43f, like reference numerals are denoted and description thereof is omitted.

At least part of a cutting edge 43f is provided with a jagged edge. As an example, as shown in FIG. 12A, the jagged edge is formed in the substantially central portion of the cutting edge 43f.

The cutting blade 4f, including the jagged edge, makes a cut piece f on which streaky pattern remains in a portion corresponding to the jagged edge as shown in FIG. 12B. The jagged edge is formed of a plurality of small zigzag edges that are further provided in a single corrugation of the corrugated blade described so far. For example, the jagged edge may be formed by making the corrugation of the corrugated blade finer or may be provided with pointed tips. Alternatively, it may be triangular edges (i.e., a saw blade).

[Third Modification of Third Embodiment]

Figure 13:
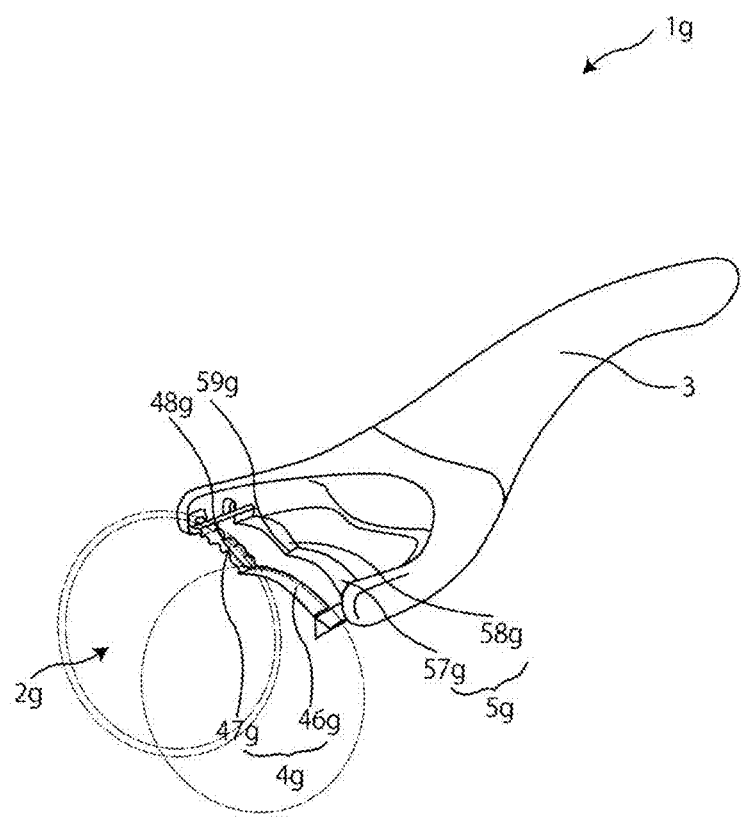
FIG. 13 is a view illustrating a cooking device according to a third modification of the third embodiment.

FIG. 13 is a view illustrating a cooking device 1g according to a third modification of the third embodiment. The cooking device 1g is similar to the cooking device 1d according to the third embodiment except for a cutter 2g, wherein like reference numerals denote like elements and points different from the cooking device 1d are described.

A cutter 2g includes a cutting blade 4g for cutting food in cutting work and a guide 5g functioning as a guide in the cutting work.

The cutting blade 4g includes two cutting blades, which are arranged in a direction orthogonal to the cutting direction with an end of one cutting blade coupled to an end of another cutting blade. As an example, the cutting blade 4g is formed of two cutting blades, that is, a first cutting blade 46g having an arcuate shape and a second cutting blade 47g having an arcuate shape including a corrugated portion. Both the first cutting blade 46g and second cutting blade 47g are upwardly arcuate and are arcs each on different circumferences. The first cutting blade 46g and the second cutting blade 47g are coupled in a cutting blade coupling portion 48g.

The guide 5g includes two guides, which are arranged in a direction orthogonal to the cutting direction with an end of one guide coupled to an end of another guide. As an example, the guide 5g is formed of two guides, that is, a first guide 57g having an arcuate shape and a second guide 58g having an arcuate shape. Both the first guide 57g and second guide 58g are upwardly arcuate and are arcs each on different circumferences. The first guide 57g and the second guide 58g are coupled in a guide coupling portion 59g.

The guide 5g is located forward of the cutting blade 4g and is disposed above the cutting blade 4g. When the cooking device 1g is moved in the cutting direction (i.e., forward), the guide 5g guides cutting work along the surface of food to be cut, the cutting blade 4g penetrates and cuts the food to be cut, and corrugation is formed only on part of the surface, a cut piece having two arcuate portions is obtained.

Thus, by using the cooking device 1g, a more variety of plate-shaped cut pieces can be easily obtained.

[Fourth Embodiment]

Figure 14:
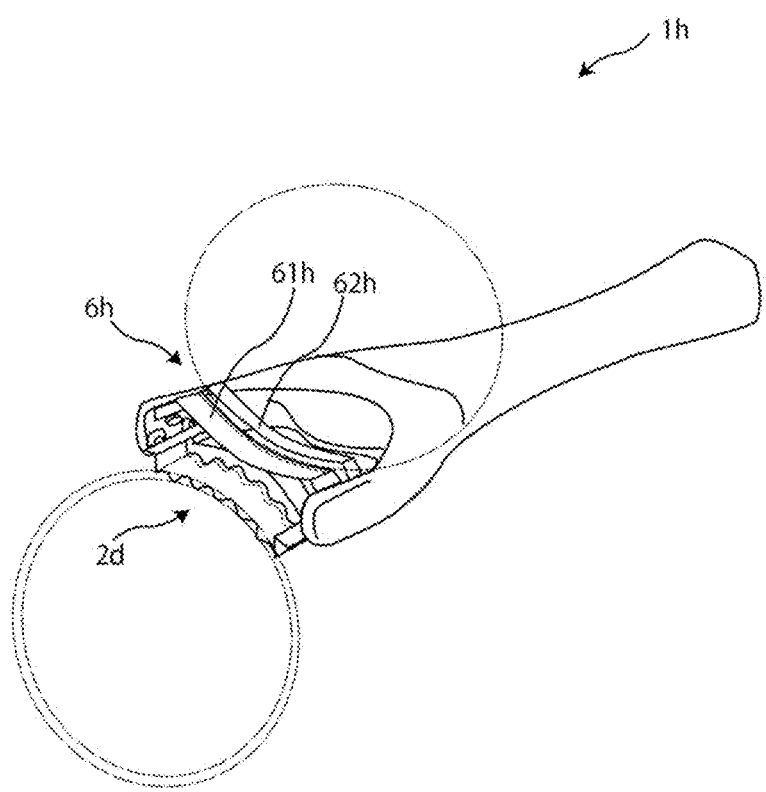
FIG. 14 is a view illustrating a cooking device according to a fourth embodiment.

FIG. 14 is a view illustrating a cooking device 1h according to a fourth embodiment. The cooking device 1h is similar to the cooking device 1d according to the third embodiment except for including a second cutter 6h, wherein like reference numerals denote like elements and points different from the cooking device 1d are described.

A cooking device 1h includes two cutters, that is, a first cutter 2d and a second cutter 6h. The first cutter 2d is as described above, and description thereof is omitted herein.

The second cutter 6h is disposed at a predetermined distance above the first cutter 2d. The second cutter 6h is structured similarly to the first cutter 2d except that a cutting blade 61h includes no corrugated portion.

Specifically, the second cutter 6h includes a cutting blade 61h and a guide 62h. The cutting blade 61h has an arcuate plate with no corrugated portion. In use of the second cutter 6h for cutting work, the cooking device 1h is used turned upside down. Under this condition, the cutting blade 61h and the guide 62h are upwardly arcuate. That is, the cutting blade 61h and the guide 62h of the second cutter 6h have an arcuate shape expanding in a direction different from that of the cutting blade and the guide of the first cutter 2d.

The cutting work may be performed using one or both of the first cutter 2d and the second cutter 6h depending on cut pieces needed, and thus differently shaped cut pieces can be easily obtained using a single cooking device 1h.

While the embodiments of the cooking device according to the present invention have been described above, these are merely examples of the embodiments of the present invention, and the present invention is not limited thereto. The present invention includes combinations of the above embodiments and various modifications.

For example, while the corrugation of the cutting blade has been illustrated and described as an arcuate shape in the above, the present invention is not limited thereto, and the corrugation may be triangular-wave shaped, square-wave shaped, or trapezoidal-wave shaped. At the same time, at least the guide surface of the guide may also have a triangular-wave shape, a square-wave shape, or a trapezoidal-wave shape corresponding to the shape of the cutting blade.

Figure 15:
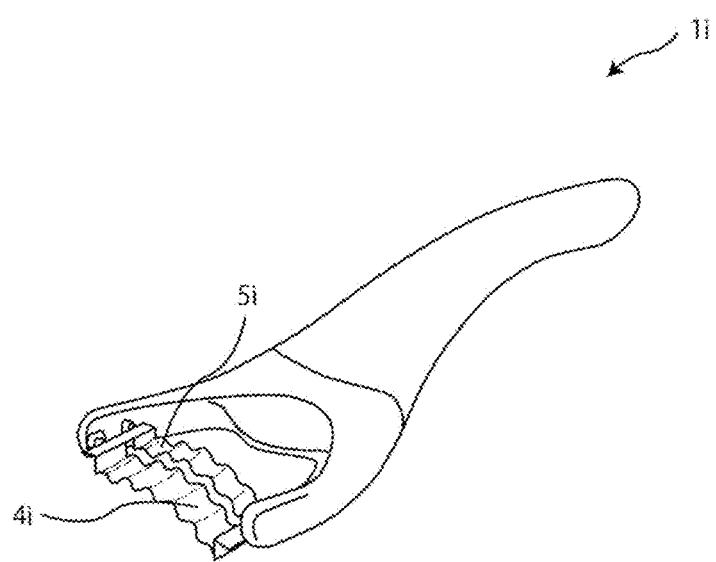
FIG. 15 is a view illustrating a cooking device according to another example of the present application.

The cooking device according to the present application may be formed such that a cutting blade 4*i* curves in the cutting direction as seen in a cooking device 1*i* of FIG. 15. That is, ridge peak lines are upwardly warped. This prevents the deformation of the cutting blade during use and also induces curvature of cut pieces. Likewise, a guide 5*i* may also have an upwardly warped shape. Although not shown in the drawings, the cutting blade of the cooking device according to the present application may be provided longitudinally with a rib to reinforce its strength.

The present invention also includes a cooking method for cutting food to be cut using the cooking device according to the above embodiments and modifications thereof and food cut by the cooking method.

REFERENCE SIGNS LIST 1, 1*a*, 1*b*, 1*c*, 1*d*, 1*e*, 1*f*, 1*g*, 1*h* cooking device
2, 2*a*, 2*b*, 2*c*, 2*d*, 2*e*, 2*f*, 2*g*, 2*h* cutter (first cutter)
21 connecting portion
3 grip
31 holder
4, 4*c*, 4*d*, 4*f*, 4*g* cutting blade
41, 41*d* ridge peak
42, 42*d* valley bottom
43, 43*d*, 43*f* cutting edge
44*c* cutting blade position changer
45*c* bolt
46*g* first cutting blade
47*g* second cutting blade
48*g* cutting blade coupling portion
5, 5*a*, 5*b*, 5*d*, 5*e*, 5*g* guide
51, 51*a* guide surface
52, 52*a* ridge peak
53, 53*a* valley bottom
54*b* rotational guide
55*b* guide position changer
56*b* knob
57*g* first guide
58*g* second guide
59*g* guide coupling portion
6*h* second cutter

The invention claimed is:

1. A cooking device comprising:
a cutter; and
a grip to which the cutter is attached, wherein
the cutter includes a cutting blade and a guide,
the cutting blade includes a blade body with a cutting edge, an opposite edge opposite the cutting edge, a first end and a second end, and the blade body is corrugated from the first end to the second end thereof between the cutting edge and the opposite edge with alternating valleys each having a downwardly concave shape in a direction approaching food to be cut and ridges each having an upwardly convex shape, opposite to downward,
the blade body of the cutting blade has alternating ridge peaks being peaks of the ridges of the blade body and valley bottoms being bottoms of the valleys of the blade body, and
the guide has a guide surface for following food to be cut, at least part of the guide surface being located at a same height as the ridge peaks of the blade body or located at a height that is between the ridge peaks of the blade body and the valley bottoms of the blade body in a vertical direction;
the blade body is arcuate from the first end to the second end thereof, and
the guide has a first end and a second end, and the guide is arcuate from the first end to the second end thereof.

2. A cooking device comprising:
a cutter; and
a grip to which the cutter is attached, wherein
the cutter includes a cutting blade and a guide,
the cutting blade includes a blade body with a cutting edge, an opposite edge opposite the cutting edge, a first end and a second end, and the blade body is corrugated from the first end to the second end thereof between the cutting edge and the opposite edge with alternating valleys each having a downwardly concave shape in a direction approaching food to be cut and ridges each having an upwardly convex shape, opposite to downward,
the blade body of the cutting blade has alternating ridge peaks being peaks of the ridges of the blade body and valley bottoms being bottoms of the valleys of the blade body, and
the guide has a guide surface for following food to be cut, at least part of the guide surface being located at a same height as the ridge peaks of the blade body or located at a height that is between the ridge peaks of the blade body and the valley bottoms of the blade body in a vertical direction;
the cutter comprises two of the cutting blades and two of the guides,
the two cutting blades are arranged in a direction orthogonal to the cutting direction with an end of one of the cutting blades coupled to an end of the other cutting blade, and
the two guides are arranged in a direction orthogonal to the cutting direction with an end of one of the guides coupled to an end of the other guide.

3. A cooking device comprising:
a cutter; and
a grip to which the cutter is attached, wherein
the cutter includes two cutting blades and two guides,
each of the cutting blades includes a corrugated portion with alternating valleys each having a downwardly concave shape in a direction approaching food to be cut and ridges each having an upwardly convex shape, opposite to downward,
each of the cutting blades has alternating ridge peaks being peaks of the ridges of the cutting blade and valley bottoms being bottoms of the valleys of the cutting blade, and
each of the guides has a guide surface for following food to be cut, at least part of the guide surface being located at a same height as the ridge peaks of the respective cutting blade or located at a height that is between the ridge peaks of the respective cutting blade and the valley bottoms of the cutting blade in a vertical direction;
the two cutting blades are arranged in a direction orthogonal to the cutting direction with an end of one of the cutting blades coupled to an end of the other cutting blade, and
the two guides are arranged in a direction orthogonal to the cutting direction with an end of one of the guides coupled to an end of the other guide.

* * * * *